United States Patent [19]

Römer et al.

[11] Patent Number: 4,473,487
[45] Date of Patent: Sep. 25, 1984

[54] 4-FLUOROBIPHENYL DERIVATIVES, THEIR PREPARATION, AND DIELECTRICS AND ELECTRO-OPTICAL DISPLAY ELEMENT CONTAINING THEM

[75] Inventors: Michael Römer, Rodgau; Joachim Krause, Dieburg; Georg Weber, Erzhausen, all of Fed. Rep. of Germany

[73] Assignee: Merck Patent Gesellschaft Mit Beschränkter Haftung, Darmstadt, Fed. Rep. of Germany

[21] Appl. No.: 453,046

[22] Filed: Dec. 27, 1982

[30] Foreign Application Priority Data

Dec. 24, 1981 [DE] Fed. Rep. of Germany ....... 3151356

[51] Int. Cl.³ .................. C09K 3/34; G02F 1/13; C07C 61/40; C07C 62/34; C07C 63/72; C07C 69/77; C07C 65/24
[52] U.S. Cl. .................. 252/299.63; 252/299.5; 252/299.65; 350/350 R; 560/1; 560/61; 560/64; 560/72; 560/73; 560/102; 560/108; 560/126
[58] Field of Search .......... 252/299.5, 299.63, 299.65; 560/61, 64, 72, 73, 1, 102, 108, 126; 350/350 R

[56] References Cited

U.S. PATENT DOCUMENTS

| | | | |
|---|---|---|---|
| 4,065,489 | 12/1977 | Steinstrasser et al. | 252/299.65 |
| 4,113,647 | 9/1978 | Coates et al. | 252/299.63 |
| 4,340,498 | 7/1982 | Sugimori et al. | 252/299.5 |
| 4,398,803 | 8/1983 | Pohl et al. | 252/299.63 |
| 4,399,298 | 8/1983 | Sugimori et al. | 252/299.5 |
| 4,405,488 | 9/1983 | Sugimori et al. | 252/299.63 |
| 4,415,470 | 11/1983 | Eidenschink et al. | 252/299.5 |

FOREIGN PATENT DOCUMENTS

| | | | |
|---|---|---|---|
| 19665 | 12/1980 | European Pat. Off. | 252/299.63 |
| 2600558 | 7/1976 | Fed. Rep. of Germany | 252/299.65 |
| 137928 | 10/1979 | German Democratic Rep. | 252/299.63 |
| 56-149486 | 11/1981 | Japan | 252/299.63 |
| 57-64645 | 4/1982 | Japan | 252/299.63 |
| 57-91953 | 6/1982 | Japan | 252/299.63 |

OTHER PUBLICATIONS

Cas Registry Handbook, Number Section; RN 71729-6-2-9, [1,1'—Biphenyl]—4—Carboxylic Acid, 4'—Fluoro—,4—Propoxyphenyl Ester (1979 Suppl.).
Coates et al., Mol. Cryst. Liq. Cryst., vol. 37, pp. 249-262 (1976).

*Primary Examiner*—Teddy S. Gron
*Attorney, Agent, or Firm*—Millen & White

[57] ABSTRACT

4-Fluorobiphenyl derivatives of the formula (I)

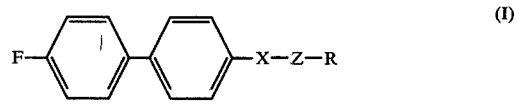

(I)

wherein X is —CO—O— or —O—CO—; Z is 1,4-phenylene or 1,4-cyclohexylene; and R is alkyl, alkoxy or alkanoyloxy, each of 1 to 8 atoms, are valuable components of liquid-crystalline dielectrics for electro-optical applications.

11 Claims, No Drawings

4-FLUOROBIPHENYL DERIVATIVES, THEIR PREPARATION, AND DIELECTRICS AND ELECTRO-OPTICAL DISPLAY ELEMENT CONTAINING THEM

BACKGROUND OF THE INVENTION

The present invention relates to new 4-fluorobiphenyl derivatives having valuable liquid crystalline properties.

For use in the twisted cell, as a rule, liquid crystalline dielectric substance mixtures having positive dielectric anisotropy are employed. Examples of suitable components of these mixtures include esters, most of which, however, have only a low positive dielectric anisotropy. The use of p-cyanophenyl esters does in fact lead to a striking increase in the positive dielectric anisotropy but is combined at the same time with an increase in viscosity, which restricts their applicability. For this reason, it is desirable to extend the range of liquid-crystalline compounds which are suitable as components of dielectrics and which exhibit the abovementioned disadvantages either not at all or only to a slight extent.

SUMMARY OF THE INVENTION

Accordingly, it is an object of this invention to provide new liquid-crystalline compounds, which are suitable as components of liquid-crystalline dielectrics and, in particular, which have both a high positive dielectric anisotropy and also a low viscosity.

Upon further study of the specification and appended claims, further objects and advantages of this invention will become apparent to those skilled in the art.

These objects have been achieved by providing the compounds of formula (I)

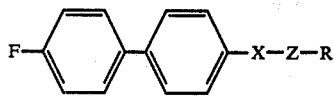
(I)

wherein X is —CO—O— or —O—CO—; Z is 1,4-phenylene or 1,4-cyclohexylene; and R is alkyl, alkoxy or alkanoyloxy, each of 1 to 8 C atoms.

Thus, the present invention relates to the compounds of formula (I), a process for their preparation and their use as components of liquid-crystalline dielectrics. In addition, this invention relates to liquid-crystalline dielectrics containing at least one compound of formula I and electro-optical display elements based on a liquid-crystal cell which contains a dielectric of this type.

DETAILED DISCUSSION

These substances can be used analogously to the use of similar compounds of the prior art, for example those disclosed in German Offenlegungsschrift No. 2,800,553, whose disclosure is incorporated by reference herein, as components of liquid-crystalline dielectrics, in particular for displays which are based on the principle of the twisted cell.

It has been found that the compounds of formula (I) are excellently suitable as components of liquid-crystalline dielectrics. In particular, liquid-crystalline phases having relatively high dielectric anisotropy and relatively low viscosity can be prepared using them. The addition of these compounds to other liquid-crystalline substances provides liquid-crystalline dielectrics which have short switching times at low temperatures.

The compounds of formula (I) are colorless in the pure state and form liquid-crystalline mesophases in a range of temperature which is favorable for electro-optical use. The compounds of formula (I), in particular, comprise the preferred 4'-fluorobiphenyl-4-yl benzoates and cyclohexanecarboxylates of formulae (Ia) and (Ib)

wherein Fb is a 4'-fluorobiphenyl-4-yl radical, Cy is a 1,4-cyclohexylene radical and Ph is a 1,4-phenylene radical.

Furthermore, formula (I) includes the phenyl 4'-fluorobiphenyl-4-ylcarboxylates of formula (Ic) and the cyclohexyl 4'-fluorobiphenyl-4-ylcarboxylates of formula (Id)

wherein R, Fb, Cy and Ph have the above-defined meanings.

In the compounds of formulae (I) and (Ib) and (Id), those stereoisomers are preferred in which the two 1,4 substituents are each in the trans-position with respect to one another.

In the compounds of formula (I), the radical R is preferably straight-chained and, thus, is preferably methyl, ethyl, n-propyl, n-butyl, n-pentyl, n-hexyl, n-heptyl, n-octyl, methoxy, ethoxy, n-propyloxy, n-butyloxy, n-pentyloxy, n-heptyloxy, n-octyloxy, formyloxy, acetoxy, propionyloxy, butyryloxy, pentanoyloxy, hexanoyloxy, heptanoyloxy or octanoyloxy.

Compounds of formula (I) having a branched group R can occasionally be of importance in the customary liquid-crystalline base materials because of their better solubility, but they are of particular importance as chiral doping materials when they have optical activity due to the chain branching. As a rule, branched groups R contain not more than one chain branching. Preferred branched radicals are isopropyl, 2-methylpropyl, 2-methylbutyl, 3-methylbutyl, 2-methylpentyl, 3-methylpentyl, 2-ethylhexyl, 1-methylhexyl, 1-methylheptyl, isopropyloxy, 2-methylpropyloxy, 2-methylbutyloxy, 3-methylbutyloxy, 2-methylpentyloxy, 3-methylpentyloxy, 2-ethylhexyloxy, 1-methylhexyloxy, 1-methylheptyloxy, isobutyryloxy, 2-methylbutyryloxy, 3-methylbutyryloxy, 3-ethylbutyryloxy, 2-ethylbutyryloxy, 2-, 3- or 4-methylpentanoyloxy, or 2- or 3-ethylpentanoyloxy. All groups R contain 1-8, preferably 3-5, C atoms. The alkyl groups are preferred to the alkoxy and the alkanoyloxy groups.

The process of this invention for the preparation of the compounds of formula (I) comprises reacting a carboxylic acid of formula (II)

wherein R$^1$ is

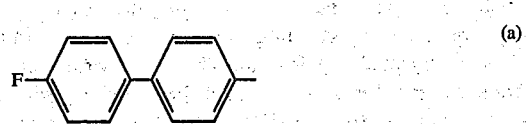

or (b) R—Z— and R and Z are as defined in claim 1, or a reactive derivative thereof with a hydroxy compound of formula (III)

$$R^2\text{—OH} \tag{III}$$

wherein $R^2$, in case (a), is R—Z—, or in case (b), is

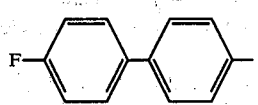

and R and Z are as defined above, or a reactive derivative thereof.

Furthermore, the compounds of formula (I) are prepared by methods which are known per se, as described in the literature (for example, in the standard works, such as Houben-Weyl, Methoden der Organischen Chemie (Methods of Organic Chemistry), Georg-Thieme-Verlag, Stuttgart), whose disclosures are incorporated by reference herein, mainly under reaction conditions which are known and suitable for the reactions mentioned. For this purpose, use can also be made of variants which are known per se but which are not mentioned in more detail here.

The starting materials can, if desired, also be formed in situ, in such a manner that they are not isolated from the reaction mixture, but are immediately reacted further to yield the compounds of formula (I).

Particularly suitable reactive derivatives of the carboxylic acids of formula (II) are the acid halides, particularly the chlorides and bromides, also the anhydrides, for example also mixed anhydrides of the formula $R^1$—CO—O—COCH$_3$, azides, and esters, in particular alkyl esters having 1–4 C atoms in the alkyl group.

Particularly suitable reactive derivatives of the alcohols or phenols of formula (III) are the corresponding metal alcoholates or phenolates of the formula $R^2$—OM, in which M is one equivalent of a metal, preferably an alkali metal, such as Na or K.

The esterification is advantageously carried out in the presence of an inert solvent. The following are particularly suitable: ethers, such as diethyl ether, di-n-butyl ether, tetrahydrofuran, dioxane or anisole, ketones, such as acetone, butanone or cyclohexanone, amides, such as dimethylformamide or phosphoric hexamethyltriamide, hydrocarbons, such as benzene, toluene or xylene, halogenated hydrocarbons, such as carbon tetrachloride or tetrachloroethylene and sulfoxides, such as dimethyl sulfoxide or sulfolane. Solvents which are not miscible with water can advantageously be used at the same time for azeotropic distillation out of the water formed in the esterification. If appropriate, an excess of an organic base, for example pyridine, quinoline or triethylamine, can also be used as the solvent for the esterification. The esterification can also be carried out in the absence of a solvent, for example by simply heating the components in the presence of sodium acetate.

The reaction temperature is customarily between −50° and +250°, preferably between −20° and +80°. At these temperatures, the esterification reactions are complete, as a rule, after 15 minutes to 48 hours.

The specific rotation conditions for the esterification largely depend on the nature of the starting materials used. Thus, as a rule, a free carboxylic acid of formula (II) is reacted with an alcohol or phenol of formula (III) in the presence of a strong acid, for example a mineral acid, such as hydrochloric acid or sulfuric acid.

A preferred mode of reaction is to react an acid anhydride or, in particular, an acid chloride with an alcohol, preferably in a basic medium, particular bases of importance being alkali metal hydroxides, such as sodium or potassium hydroxide, alkali metal carbonates or bicarbonates, such as sodium carbonate, sodium bicarbonate, potassium carbonate or potassium bicarbonate, alkali metal acetates, such as sodium or potassium acetate, alkaline earth metal hydroxides, such as calcium hydroxide or organic bases, such as triethylamine, pyridine, lutidine, collidine or quinoline.

A further preferred embodiment of the process of this invention comprises initially converting the hydroxy compound of formula (III), which is to be esterified, into its sodium or potassium alcoholate or phenolate, for example by treating it with ethanolic sodium or potassium hydroxide solution, isolating the latter and suspending it, together with sodium bicarbonate or potassium carbonate, with stirring in acetone or diethyl ether and adding to this suspension a solution of the acid chloride or anhydride in diethyl ether, acetone or dimethylformamide, preferably at temperatures between about −25° and +20°.

The starting materials of formulae (II) and (III) and their reactive derivatives are known for the most part. The others can also be prepared without difficulty using routine processes in organic chemistry from compounds known from the literature. For the preparation of the Cy-containing compounds, the starting materials contain trans-Cy groups which are also all known or conventionally preparable from known starting materials. The trans-configuration is retained during the process of this invention.

The dielectrics of this invention comprise 2 to 15, preferably 3 to 12, components, including at least one compound of formula (I). The other constituents are selected from the nematic or nematogenic substances, e.g., from the known classes of azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbenzenes, 4,4'-biscyclohexylbiphenyls, phenylpyrimidines or cyclohexylpyrimidines, phenyldioxanes or cyclohexyldioxanes, stilbenes which may be halogenated, benzyl phenyl ethers, tolanes and substituted cinnamic acids. The most important compounds which can be used as constituents of liquid-crystalline dielectrics of this type can be characterized by formula (IV), $$R^1\text{—D—B—D—}R^2 \tag{IV}$$

wherein each D independently is a carbocyclic or heterocyclic ring system from the group comprising 1,4-disubstituted benzene and cyclohexene rings, 4,4'-disubstituted diphenyl, phenylcyclohexane and cyclohexylcyclohexane systems, 2,5-disubstituted pyrimidine and 1,3-dioxane rings, 2,6-disubstituted naphthalene, dihydronaphthalene and tetrahydronaphthalene, quinazoline and tetrahydroquinazoline; B is

| | |
|---|---|
| —CH=CH— | —N(O)=N— |
| —CH=CY— | —CH=N(O)— |
| —C≡C— | —CH₂—CH₂— |
| —CO—O— | —CH₂—O— |
| —CO—S— | —CH₂—S— |
| —CH=N— | —COO—Ph—COO— | or a C—C single bond, Y is halogen, preferably chlorine, or —CN, and R¹ and R² are alkyl, alkoxy, alkanoyloxy or alkoxycarbonyloxy, each having up to 18, preferably up to 8, carbon atoms, or one of these radicals is also —CN, —NC, —NO₂, —CF₃, F, Cl or Br. In most of these compounds, R¹ and R² are different from one another, one of these radicals being an alkyl group or an alkoxy group in most cases. Other variants of the envisaged substituents, however, are also common. Many such substances, or even mixtures thereof, are commercially available.

The dielectrics of this invention contain about 0.1 to 30, as a rule at least 5, preferably 10–25, % of the compounds of formula (I). However, the invention also comprises those liquid-crystalline dielectrics to which only less than 5%, for example 0.1 to 3%, of one or more compounds of formula (I) have been added, for example for doping purposes.

The preparation of the dielectrics according to this invention is carried out in a fully conventional manner. As a rule, the desired amount of the components used in a smaller quantity is dissolved in the component representing the main constituent, preferably at an elevated temperature. If a temperature above the clear point of the main constituent is chosen for this, the completeness of the solution process can be observed with particular ease.

The liquid-crystalline dielectrics according to this invention can be modified by suitable additives in such a way that they can be used in all hitherto disclosed types of liquid-crystal display elements.

Additives of these types are known to those skilled in the art and are extensively described in the relevant literature. For example, it is possible to add dichroic dyes or substances which are intended to modify the dielectric anisotropy, the viscosity, the conductivity and/or the orientation of the nematic phases. Substances of these types are described, for example, in German Offenlegungsschriften Nos. 2,209,127, 2,240,864, 2,321,632, 2,338,281, 2,450,088, 2,637,430, 2,853,728 and 2,902,177.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight. In the examples, m.p. denotes the melting point, and c.p. denotes the clear point of a liquid-crystalline substance.

EXAMPLE 1

A solution of 18.8 g of trans-4-propylcyclohexanecarbonyl chloride in 20 ml of toluene was added dropwise to a solution of 18.8 g of 4'-fluoro-4-hydroxybiphenyl and 8 g of pyridine in 25 ml of toluene and the mixture was heated, with stirring, at 80° for 20 hours. After cooling down water was added, the phases were separated, the organic phase was washed, evaporated and 4'-fluorobiphenyl-4-yl trans-4-propylcyclohexanecarboxylate was obtained, m.p. 96°, c.p. 174°.

EXAMPLES 2 TO 100

The following compounds are obtained by esterification of the corresponding acids in analogy to Example 1:

2. 4'-fluorobiphenyl-4-yl trans-4-methylcyclohexanecarboxylate.
3. 4'-fluorobiphenyl-4-yl trans-4-ethylcyclohexanecarboxylate.
4. 4'-fluorobiphenyl-4-yl trans-4-butylcyclohexanecarboxylate.
5. 4'-fluorobiphenyl-4-yl trans-4-pentylcyclohexanecarboxylate.
6. 4'-fluorobiphenyl-4-yl trans-4-(2-methylbutyl)cyclohexanecarboxylate.
7. 4'-fluorobiphenyl-4-yl trans-4-hexylcyclohexanecarboxylate.
8. 4'-fluorobiphenyl-4-yl trans-4-heptylcyclohexanecarboxylate.
9. 4'-fluorobiphenyl-4-yl trans-4-octylcyclohexanecarboxylate.
10. 4'-fluorobiphenyl-4-yl trans-4-(1-methylheptyl)cyclohexanecarboxylate.
11. 4'-fluorobiphenyl-4-yl trans-4-methoxycyclohexanecarboxylate.
12. 4'-fluorobiphenyl-4-yl trans-4-ethoxycyclohexanecarboxylate.
13. 4'-fluorobiphenyl-4-yl trans-4-propoxycyclohexanecarboxylate.
14. 4'-fluorobiphenyl-4-yl trans-4-butoxycyclohexanecarboxylate.
15. 4'-fluorobiphenyl-4-yl trans-4-pentyloxycyclohexanecarboxylate.
16. 4'-fluorobiphenyl-4-yl trans-4-hexyloxycyclohexanecarboxylate.
17. 4'-fluorobiphenyl-4-yl trans-4-heptyloxycyclohexanecarboxylate.
18. 4'-fluorobiphenyl-4-yl trans-4-octyloxycyclohexanecarboxylate.
19. 4'-fluorobiphenyl-4-yl trans-4-formyloxycyclohexanecarboxylate.
20. 4'-fluorobiphenyl-4-yl trans-4-acetoxycyclohexanecarboxylate.
21. 4'-fluorobiphenyl-4-yl trans-4-propionyloxycyclohexanecarboxylate.
22. 4'-fluorobiphenyl-4-yl trans-4-butyryloxycyclohexanecarboxylate.
23. 4'-fluorobiphenyl-4-yl trans-4-pentanoyloxycyclohexanecarboxylate.
24. 4'-fluorobiphenyl-4-yl trans-4-hexanoyloxycyclohexanecarboxylate.
25. 4'-fluorobiphenyl-4-yl trans-4-heptanoyloxycyclohexanecarboxylate.
26. 4'-fluorobiphenyl-4-yl trans-4-octanoyloxycyclohexanecarboxylate.
27. 4'-fluorobiphenyl-4-yl p-methylbenzoate.
28. 4'-fluorobiphenyl-4-yl p-ethylbenzoate.
29. 4'-fluorobiphenyl-4-yl p-propylbenzoate.
30. 4'-fluorobiphenyl-4-yl p-butylbenzoate.
31. 4'-fluorobiphenyl-4-yl p-pentylbenzoate.
32. 4'-fluorobiphenyl-4-yl p-(2-methylbutyl)benzoate.
33. 4'-fluorobiphenyl-4-yl p-hexylbenzoate.

34. 4'-fluorobiphenyl-4-yl p-heptylbenzoate.
35. 4'-fluorobiphenyl-4-yl p-octylbenzoate.
36. 4'-fluorobiphenyl-4-yl p-(1-methylheptyl)benzoate.
37. 4'-fluorobiphenyl-4-yl p-methoxybenzoate.
38. 4'-fluorobiphenyl-4-yl p-ethoxybenzoate.
39. 4'-fluorobiphenyl-4-yl p-propoxybenzoate.
40. 4'-fluorobiphenyl-4-yl p-butoxybenzoate.
41. 4'-fluorobiphenyl-4-yl p-pentyloxybenzoate.
42. 4'-fluorobiphenyl-4-yl p-hexyloxybenzoate.
43. 4'-fluorobiphenyl-4-yl p-heptyloxybenzoate.
44. 4'-fluorobiphenyl-4-yl p-octyloxybenzoate.
45. 4'-fluorobiphenyl-4-yl p-formyloxybenzoate.
46. 4'-fluorobiphenyl-4-yl p-acetoxybenzoate.
47. 4'-fluorobiphenyl-4-yl p-propionyloxybenzoate.
48. 4'-fluorobiphenyl-4-yl p-butyryloxybenzoate.
49. 4'-fluorobiphenyl-4-yl p-pentanoyloxybenzoate.
50. 4'-fluorobiphenyl-4-yl p-hexanoyloxybenzoate, m.p. 124°, c.p. 199°.
51. 4'-fluorobiphenyl-4-yl p-heptanoyloxybenzoate.
52. 4'-fluorobiphenyl-4-yl p-octanoyloxybenzoate.
53. p-methylphenyl 4'-fluorobiphenyl-4-ylcarboxylate.
54. p-ethylphenyl 4'-fluorobiphenyl-4-ylcarboxylate.
55. p-propylphenyl 4'-fluorobiphenyl-4-ylcarboxylate.
56. p-butylphenyl 4'-fluorobiphenyl-4-ylcarboxylate.
57. p-pentylphenyl 4'-fluorobiphenyl-4-ylcarboxylate.
58. p-hexylphenyl 4'-fluorobiphenol-4-ylcarboxylate.
59. p-heptylphenyl 4'-fluorobiphenyl-4-ylcarboxylate.
60. p-octylphenyl 4'-fluorobiphenyl-4-ylcarboxylate.
61. p-methoxyphenyl 4'-fluorobiphenyl-4-ylcarboxylate.
62. p-ethoxyphenyl 4'-fluorobiphenyl-4-ylcarboxylate.
63. p-propoxyphenyl 4'-fluorobiphenyl-4-ylcarboxylate.
64. p-butoxyphenyl 4'-fluorobiphenyl-4-ylcarboxylate.
65. p-pentyloxyphenyl 4'-fluorobiphenyl-4-ylcarboxylate.
66. p-hexyloxyphenyl 4'-fluorobiphenyl-4-ylcarboxylate.
67. p-heptyloxyphenyl 4'-fluorobiphenyl-4-ylcarboxylate.
68. p-octyloxyphenyl 4'-fluorobiphenyl-4-ylcarboxylate.
69. p-formyloxyphenyl 4'-fluorobiphenyl-4-ylcarboxylate.
70. p-acetoxyphenyl 4'-fluorobiphenyl-4-ylcarboxylate.
71. p-propionyloxyphenyl 4'-fluorobiphenyl-4-ylcarboxylate.
72. p-butyryloxyphenyl 4'-fluorobiphenyl-4-ylcarboxylate.
73. p-pentanoyloxyphenyl 4'-fluorobiphenyl-4-ylcarboxylate.
74. p-hexanoyloxyphenyl 4'-fluorobiphenyl-4-ylcarboxylate.
75. p-heptanoyloxyphenyl 4'-fluorobiphenyl-4-ylcarboxylate.
76. p-octanoyloxyphenyl 4'-fluorobiphenyl-4-ylcarboxylate.
77. trans-4-methylcyclohexyl 4'-fluorobiphenyl-4-ylcarboxylate.
78. trans-4-ethylcyclohexyl 4'-fluorobiphenyl-4-ylcarboxylate.
79. trans-4-propylcyclohexyl 4'-fluorobiphenyl-4-ylcarboxylate.
80. trans-4-butylcyclohexyl 4'-fluorobiphenyl-4-ylcarboxylate.
81. trans-4-pentylcyclohexyl 4'-fluorobiphenyl-4-ylcarboxylate.
82. trans-4-hexylcyclohexyl 4'-fluorobiphenyl-4-ylcarboxylate.
83. trans-4-heptylcyclohexyl 4'-fluorobiphenyl-4-ylcarboxylate.
84. trans-4-octylcyclohexyl 4'-fluorobiphenyl-4-ylcarboxylate.
85. trans-4-methoxycyclohexyl 4'-fluorobiphenyl-4-ylcarboxylate.
86. trans-4-ethoxycyclohexyl 4'-fluorobiphenyl-4-ylcarboxylate.
87. trans-4-propoxycyclohexyl 4'-fluorobiphenyl-4-ylcarboxylate.
88. trans-4-butoxycyclohexyl 4'-fluorobiphenyl-4-ylcarboxylate.
89. trans-4-pentyloxycyclohexyl 4'-fluorobiphenyl-4-ylcarboxylate.
90. trans-4-hexyloxycyclohexyl 4'-fluorobiphenyl-4yl-carboxylate.
91. trans-4-heptyloxycyclohexyl 4'-fluorobiphenyl-4-ylcarboxylate.
92. trans-4-octyloxycyclohexyl 4'-fluorobiphenyl-4-ylcarboxylate.
93. trans-4-formyloxycyclohexyl 4'-fluorobiphenyl-4-ylcarboxylate.
94. trans-4-acetoxycyclohexyl 4'-fluorobiphenol-4-ylcarboxylate.
95. trans-4-propionyloxycyclohexyl 4'-fluorobiphenyl-4-ylcarboxylate.
96. trans-4-butyryloxycyclohexyl 4'-fluorobiphenyl-4-ylcarboxylate.
97. trans-4-pentanoyloxycyclohexyl 4'-fluorobiphenyl-4-ylcarboxylate.
98. trans-4-hexanoyloxycyclohexyl 4'-fluorobiphenyl-4-ylcarboxylate.
99. trans-4-heptanoyloxycyclohexyl 4'-fluorobiphenyl-4-ylcarboxylate.
100. trans-4-octanoyloxycyclohexyl 4'-fluorobiphenyl-4-ylcarboxylate.

The following examples relate to liquid-crystalline dielectrics which contain compounds of Formula (I).

EXAMPLE A

A dielectric composed of
25% of p-(trans-4-propylcyclohexyl)benzonitrile
37% of p-(trans-4-pentylcyclohexyl)benzonitrile
25% of p-(trans-4-heptylcyclohexyl)benzonitrile and
13% of 4'-fluorobiphenyl-4-yl trans-4-propylcyclohexanecarboxylate
has the following properties: m.p. −6°; c.p. +65°.

EXAMPLE B

A dielectric composed of
16% of p-(trans-4-ethylcyclohexyl)benzonitrile
27% of p-(trans-4-butylcyclohexyl)benzonitrile
13% of 4-ethyl-4'-cyanobiphenyl
18% of 4-butyl-4'-cyanobiphenyl
15% of 4'-fluorobiphenyl-4-yl trans-4-propylcyclohexanecarboxylate and
11% of 4'-fluorobiphenyl-4-yl p-hexanoyloxybenzoate
has the following properties: m.p. −5°; c.p. +60°.

EXAMPLE C

A dielectric composed of
34% of p-(trans-4-propylcyclohexyl)benzonitrile
30% of p-(trans4-butylcyclohexyl)benzonitrile
10% of p-cyanophenyl p-ethylbenzoate
6% of p-cyanophenyl p-propylbenzoate
12% of 4'-fluorobiphenyl-4-yl trans-4-propylcyclohexanecarboxylate and
8% of 4'-fluorobiphenyl-4-yl p-hexanoyloxybenzoate has the following properties: m.p. −3°; c.p. +67°.

EXAMPLE D

A dielectric composed of
14% of 2-p-cyanophenyl-5-propyl-1,3-dioxane
20% of 2-p-cyanophenyl-5-butyl-1,3-dioxane
15% of 2-p-cyanophenyl-5-pentyl-1,3-dioxane
21% of p-ethoxyphenyl trans-4-propylcyclohexanecarboxylate
20% p-ethoxyphenyl trans-4-butylcyclohexanecarboxylate and
10% of 4'-fluorobiphenyl-4-yl trans-4-propylcyclohexanecarboxylate
has the following properties: m.p. −4°; c.p. +67°.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 4-fluorobiphenyl derivative of the formula

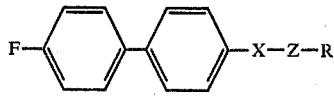

wherein X is —O—CO; Z is 1,4-phenylene or 1,4-cyclohexylene; and R is alkyl, alkoxy or alkanoyloxy, each of 1 to 8 C atoms.

2. A compound of claim 1 wherein Z is 1,4-phenylene.

3. A compound of claim 1 wherein Z is 1,4-trans-cyclohexylene.

4. A compound of claim 1 wherein R is alkyl.

5. A compound of claim 1 wherein R is alkoxy.

6. A compound of claim 1 wherein R is alkanoyloxy.

7. A compound of claim 4 wherein R is alkyl.

8. A compound of claim 5 wherein R is alkyl.

9. A liquid-crystalline dielectric comprising at least two liquid-crystalline components, wherein at least one liquid-crystalline component is a 4-fluorobiphenyl compound of claim 1.

10. A liquid-crystalline dielectric of claim 9 wherein the proportion of said 4-fluorobiphenyl compound(s) is 0.1–30 wt. % based on the total weight of the dielectric.

11. In an electro-optical display element comprising a liquid-crystalline cell based on a liquid-crystalline dielectric, the improvement wherein the dielectric is one of claim 9.

* * * * *